United States Patent
Frankel et al.

(10) Patent No.: US 10,162,090 B1
(45) Date of Patent: Dec. 25, 2018

(54) CONFORMABLE REFLECTIVE FILM HAVING SPECIFIED REFLECTIVITY WHEN STRETCHED AT ROOM TEMPERATURE

(71) Applicant: 3M INNOVATIVE PROPERTIES COMPANY, St. Paul, MN (US)

(72) Inventors: Joan M. Frankel, Woodbury, MN (US); Kevin D. Hagen, St. Paul, MN (US); Michael A. Johnson, Stillwater, MN (US); Diane North, Inver Grove Heights, MN (US); James A. Phipps, River Falls, WI (US); Audrey A. Sherman, Woodbury, MN (US); Huiwen Tai, Lake Elmo, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 15/899,457

(22) Filed: Feb. 20, 2018

(51) Int. Cl.
| | |
|---|---|
| *G02B 5/08* | (2006.01) |
| *G02B 5/10* | (2006.01) |
| *B32B 15/08* | (2006.01) |
| *G02B 5/26* | (2006.01) |
| *B32B 38/00* | (2006.01) |
| *B60R 13/04* | (2006.01) |

(52) U.S. Cl.
CPC ............ *G02B 5/26* (2013.01); *G02B 5/0866* (2013.01); *B32B 15/08* (2013.01); *B32B 2038/0028* (2013.01); *B32B 2307/406* (2013.01); *B32B 2307/416* (2013.01); *B32B 2307/51* (2013.01); *B60R 13/04* (2013.01); *G02B 5/0858* (2013.01); *G02B 5/0875* (2013.01)

(58) Field of Classification Search
CPC ....... B32B 15/04; B32B 15/043; B32B 15/06; B32B 15/08–15/098; B32B 2038/0028; B32B 2307/406; B32B 2307/416; B32B 2307/51; B32B 2551/00; B32B 2551/08; B60R 13/00; B60R 13/005; B60R 13/02; B60R 13/04; G02B 5/0284; G02B 5/08; G02B 5/0808; G02B 5/085; G02B 5/0858; G02B 5/0866; G02B 5/0875; G02B 5/10
USPC ........ 359/599, 615, 838, 846–848, 868–871, 359/883, 884, 896; 428/31, 332–336, 428/412, 418, 423.1, 425.8, 425.9, 428/457–463, 474.4, 480, 500, 688, 689, 428/697
See application file for complete search history.

(56) References Cited

U.S. PATENT DOCUMENTS

| | | |
|---|---|---|
| RE24,906 E | 12/1960 | Ulrich |
| 3,239,478 A | 3/1966 | Harlan, Jr. |
| (Continued) | | |

FOREIGN PATENT DOCUMENTS

| | | |
|---|---|---|
| WO | WO 2006-102581 | 9/2006 |
| WO | WO 2006-102592 | 9/2006 |
| (Continued) | | |

*Primary Examiner* — Jennifer D Carruth
*Assistant Examiner* — Ryan S Dunning
(74) *Attorney, Agent, or Firm* — Daniel J. Iden

(57) ABSTRACT

The present disclosure includes a stretchable reflective film comprising a transparent polymer layer; a continuous metal layer comprising at least one of tin or indium; a non-reactive adhesive layer; and a stretchable film layer. The stretchable reflective film has at least 30% specular reflectivity when stretched by 50% of the unstretched length according to Specular Reflectivity Test Method.

22 Claims, 1 Drawing Sheet

(56) References Cited

U.S. PATENT DOCUMENTS

| | | | |
|---|---|---|---|
| 3,935,338 A | | 1/1976 | Robertson |
| 4,101,698 A | | 7/1978 | Dunning |
| 4,181,752 A | | 1/1980 | Martens |
| 4,952,650 A | | 8/1990 | Young |
| 5,169,727 A | | 12/1992 | Boardman |
| 5,897,930 A | | 4/1999 | Calhoun |
| 6,088,163 A | * | 7/2000 | Gilbert .................. B32B 27/36 359/585 |
| 6,287,672 B1 | | 9/2001 | Fields |
| 6,524,675 B1 | | 2/2003 | Mikami |
| 6,627,688 B1 | | 9/2003 | Takeda |
| 6,641,921 B2 | | 11/2003 | Falaas |
| 6,858,287 B2 | | 2/2005 | Fields |
| 2004/0219366 A1 | | 11/2004 | Johnson |
| 2005/0175843 A1 | * | 8/2005 | Johnson ................ B32B 27/08 428/423.1 |
| 2009/0053337 A1 | | 2/2009 | Hansenne |
| 2012/0222803 A1 | | 9/2012 | Bunch |

FOREIGN PATENT DOCUMENTS

| | | |
|---|---|---|
| WO | WO 2008-039658 | 4/2008 |
| WO | WO 2008-039659 | 4/2008 |

\* cited by examiner

CONFORMABLE REFLECTIVE FILM HAVING SPECIFIED REFLECTIVITY WHEN STRETCHED AT ROOM TEMPERATURE

BACKGROUND OF INVENTION

Colored and graphic films are used for a wide variety of applications, including wrapping the surface of personal or commercial vehicles, buildings, and other interior and exterior surfaces. When applied to vehicles, graphic films can provide a cost-effective alternative to repainting a vehicle. Additionally, graphic films can typically be removed, which allows for a more temporary color change when compared to paint.

Metallized films are a popular category of graphic films. Metallized films, in particular, can provide a decorative look, or specular mirror reflection, that is simpler and more cost effective than traditional chrome plating. However, manufacturing a metallized reflective film that is conformable, such that it stretches to the shape of a three-dimensional surface, has visual uniformity and reflection and remains in place when applied in deep channels or around sharp radii, is very challenging. Stretching a metallized reflective film, with or without heat, can result in haze and iridescence. This can result from cracking or disorientation of the metal itself, or from protective barrier layers cracking within the film. Some metallized reflective films have stiff layers, like PET, in order to discourage the stretching or cracking that causes hazing but these types of films are difficult to apply to a three-dimensional surface as well. They also may have a tendency to lift or pull away from a complex surface after application. Because reflective film typically contains metal, corrosion can also cause film deterioration. This is particularly true when the film is exposed to moisture, which is typical of films applied to vehicles.

There remains opportunity to create an improved conformable reflective film.

SUMMARY

The present invention addresses the challenges faced in manufacturing a conformable reflective film. Some of the challenges faced when manufacturing reflective film include: maintaining specular reflectivity and limiting or eliminating haze when the film is stretched to various lengths; providing a film that can withstand heated stretching without creating iridescence; and providing a film that can stretch easily and stay down in deep channels and around sharp radii of a surface. Various embodiments of the present invention address these challenges. The present invention can provide for a highly stretchable film that can be used to conform to the complex surface of a vehicle. Some embodiments of the present invention can be stretched while introducing minimal haze. Some embodiments of the present invention can be applied in deep channels and around sharp radii without having film lifting after 24 hours.

In one instance, the present disclosure includes a stretchable reflective film comprising a transparent polymer layer; a continuous metal layer comprising at least one of tin or indium; a non-reactive adhesive layer; and a stretchable film layer. The stretchable reflective film has at least 30% specular reflectivity when stretched by 50% of the unstretched length according to Specular Reflectivity Test Method.

In another instance, the present disclosure includes a stretchable reflective film comprising a transparent polymer layer; a continuous metal layer comprising at least one of tin or indium; a non-reactive adhesive layer; and a stretchable film layer. The stretchable reflective film has no more than 15% diffuse reflection when stretched by 50% of the unstretched length according to the Diffuse Reflectivity Test Method.

In another instance, the present disclosure includes a stretchable reflective film comprising a transparent polymer layer; a continuous metal layer comprising at least one of tin or indium; a non-reactive adhesive layer; and a stretchable film layer. The ratio of the specular reflectivity of the stretchable reflective film when stretched by 50%, to the specular reflectivity of the stretchable reflective film when unstretched is greater than 50% according to Specular Reflectivity Test Method.

In some instances, the metal layer has a thickness in the range of 30 nm to 90 nm.

In some instances, wherein the metal layer has a thickness in the range of 50 nm to 70 nm.

In some instances, the non-reactive adhesive layer is an optically clear adhesive.

In some instances, the reflective film further comprises a second adhesive layer adjacent a major surface of the stretchable film layer opposite the non-reactive adhesive layer.

In some instances, the reflective film further comprising a structured liner adjacent a major surface of the second adhesive layer opposite the stretchable film layer, wherein the structure liner comprises ridges that form channels in the second adhesive layer.

In some instances, the stretchable film layer is a non-vinyl film.

In some instances, the stretchable reflective film has no more than 15% diffuse reflection when stretched by 50% of the unstretched length according to the Diffuse Reflectivity Test Method.

BRIEF DESCRIPTION OF DRAWINGS

The invention may be more completely understood when considered with the following detailed description in connection with the accompanying drawings in which.

The embodiments shown and described herein may be utilized and structural changes may be made without departing from the scope of the invention. The figures are not necessarily to scale. Like numbers used in the figures refer to like components. However, the use of a number to refer to a component in a given figure is not intended to limit the component in another figure labeled with the same number.

DETAILED DESCRIPTION

Figure 1:
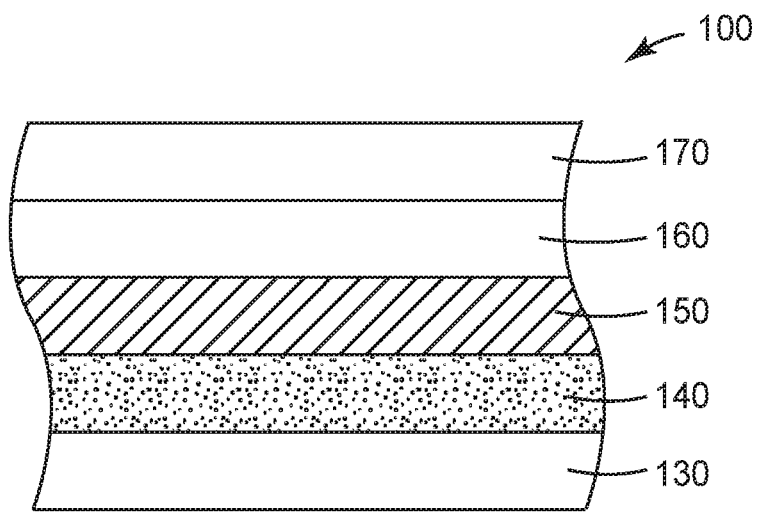
FIG. 1 shows a cross section for a stretchable reflective film consistent with the present disclosure.

FIG. 1 shows a cross section for a stretchable reflective film 100 consistent with the present disclosure. Film 100 includes casting liner 170, transparent polymer layer 160, continuous metal layer 150, non-reactive adhesive layer 140 and stretchable film layer 130. Casting liner 170 is used as a carrier on which various layers of the film are deposited. It also can serve as a protective layer to the conformable reflective film 100 after the construction is fully assembled, but is removed prior to stretching during application of the film (shown in FIG. 2)

Optional casting liner 170 is typically a paper or polymeric liner coated with a release coating for easy removal of transparent polymer layer 160. In some instances, casting liner may have a very even, smooth or glossy surface to avoid creating any visual distortion of the light reflecting off of continuous metal layer 150. In other instances, casting liner may have surface texture created by a method such as embossing or printing to give a hammered or textured appearance to continuous metal layer 150. Casting liner 170 may also be referred to as a presize liner. Casting liner 170 also may have a rough surface opposite the surface facing transparent polymer layer 160. This rough or textured surface can prevent the transparent polymer layer 160 from sticking or adhering to the opposite surface of casting liner 170 when casting liner 170 and transparent polymer layer 160 are wound on a roll, and thereby damaging the surface of transparent polymer layer 160 prior to coating of continuous metal layer 150 onto transparent polymer layer 160.

Transparent polymer layer 160 can be coated onto casting liner 170 using various coating methods. In some instances, transparent polymer layer 160 may be an extruded film or a calendared film. Transparent polymer layer 160 serves to provide a protective layer over metal layer 150 in film 100. A transparent film is one that has a low haze value as measured by a BYK Hazegard based on ASTM D1003-11. For example, a transparent film may have a haze value of less than 25%, less than 20%, less than 15%, less than 10%, or less than 5%. Transparent polymer layer 160 may be made from a variety of polymers or polymer blends, including, for example polyurethanes, polyesters, polyamides, polyolefins, polystyrenes, polycarbonates, polyacrylates, polyvinyl alcohol, polyvinyl butyral, and fluoropolymers. Transparent polymer layer 160 may have a thickness of about 10 um, 15 um, 20 um, 25 um, 30 um, 40 um, 50 um, 60 um, 70 um, 80 um, 90 um, 100 um, 125 um, 150 um, 175 um or have a thickness in a range between any two preceding thickness values.

Continuous metal layer 150 is then deposited onto transparent polymer layer 160. Continuous metal layer includes at least one of tin, indium, or alloys of tin or indium. Continuous metal layer 150 may include a single type of metal, or may include a combination of metals. In some instances, continuous metal layer includes at least 50%, 60%, 70%, 80%, 90%, 95% or 99%, 99.5%, 99.7% or 99.9% tin or indium.

Continuous metal layer 150 may be deposited on transparent polymer layer 160 using any of the techniques known in the art, including vacuum deposition, and including thermal evaporation or sputtering. In a vacuum deposition process, the source material is evaporated under a vacuum which allows vapor particles to travel directly to the polymer layer 160. The vapor particles condense onto the polymer layer, and merge with each other, to form a continuous metal layer 150. A continuous layer may include small areas of discontinuity due to manufacturing variance. However, in some embodiments, discontinuous arrays of metal droplets, closely spaced metal particles or segments, or metal flakes that are adhered to a film or coated in a resin layer do not constitute a continuous metal layer 150. In some embodiments, continuous metal layer 150 is substantially opaque.

Continuous metal layer 150 may have a range of thicknesses. For example, continuous metal layer may have a thickness of 10 nm, 15 nm, 20 nm, 25 nm, 30 nm, 40 nm, 50 nm, 60 nm, 70 nm, 80 nm, 90 nm, 100 nm, 110 nm or more. Continuous metal layer 150 may have a thickness in a range between any of the preceding thickness values.

Non-reactive adhesive layer 140 is adjacent to continuous metal layer 150. A non-reactive adhesive is an adhesive that minimally changes the resistance of the metal layer 150 once in contact with it. Non-reactive adhesives are generally neutral or basic in nature. In other words, the adhesive preferably does not contain or contains only minor amounts of acid functionality. Non-reactive adhesive layer 140 may be coated onto or laminated in a roll-to-roll process to continuous metal layer 150. Non-reactive adhesive layer 140 may be a pressure sensitive adhesive, a heat activated adhesive, or a cure-in-place adhesive. Non-reactive adhesive layer 140 may be optically clear, or may be non-optically clear. In some instances, a primer may be used to aid adhesion between non-reactive adhesive layer 140 and continuous metal layer 150. Non-reactive adhesives may include a wide range of adhesive compositions, include, for example, polyurea, polyamide, polyurethane, polyester, addition cure silicone and combinations thereof. Adhesives consistent with the present disclosure are described in further detail in U.S. Patent Publication 2009/053337 to Everaerts et al.

Stretchable film layer 130 may be a wide variety of cast or calendared polymeric films. Stretchable film layer 130 may be a vinyl film or a non-vinyl film. Examples of types of films consistent with the present disclosure include films made from a variety of polymers or polymer blends, including polyurethanes, polyesters, polyamides, polyolefins, polystyrenes, polycarbonates, polyacrylates, polyvinyl alcohol, polyvinyl butyral, polyvinyl chloride, and fluoropolymers. Commercially available films consistent with the present disclosure include 180mC 3M™ Controltac™ Graphic Film with Comply™ Adhesive and SV480mC 3M™ Envision™ Print Wrap Film.

Stretchable film layer 130 may be transparent, white or pigmented with a particular color. Stretchable film layer 130 may have a range of thicknesses. For example, stretchable film layer 130 may have a thickness of about 25 um, 50 um, 75 um, 100 um, 125 um, 150 um, 175 um, 200 um, or may have a thickness in a range between any of the two preceding thickness values.

Stretchable film layer 130 may be laminated together with the other layers of stretchable reflective film 100, or may be otherwise secured to the other layers of stretchable reflective film 100 by other methods as will be apparent to one of skill in the art upon reading the present disclosure.

Stretchable reflective film 100, when removed from casting liner 170, may be conformable, such that it can be stretched during the process of application to a complex or three-dimensional surface. A conformable film can materially or even completely take on the shape of a three-dimensional substrate containing convex features, concave features or a combination thereof. Of course, whether a film is conformable is not limited to situations in which is it actually applied to such a substrate, but simply that it displays the capability as described above. In some embodiments, taking on such shape is possible without a detrimental change to the structural integrity and/or the aesthetic appearance of the film. In this sense, conformable films are to be distinguished from non-conformable films that may be capable of being applied to planar surfaces and/or bent around surfaces that have a sufficiently large radius of curvature (such as a large cylinder), but which cannot, in practice, be applied satisfactorily to a more demanding three-dimensional substrate.

Factors that can influence the conformability of a film include the identity of the material used to make the film, the molecular weight of such material, the conditions to which such film is subjected (e.g., temperature, radiation exposure, and humidity), and the presence of additives in the film material (e.g., plasticizer content, reinforcing fibers, pigments, stabilizers (e.g., UV stabilizers), and hardness enhancing particles).

One advantage some embodiments of the present disclosure provide is maintaining a high level of specular reflectivity. Specular reflectivity is generally the mirror-like reflection of waves, such as light, from a surface. Specular reflectivity generally measures the level of reflected waves having the same angle to the surface normal as the incident ray. A stretchable reflective film, consistent with the present disclosure, may have at least 15%, 20%, 25%, 30%, 35%, 40% or 50% specular reflectivity when stretched by 50% of the unstretched length (to a total length of 150% of the original length) according to the Specular Reflectivity Test Method.

Another way to look at the specular reflectivity of a stretchable reflective film is to compare the specular reflectivity of the film when stretched to the specular reflectivity of the film when it is unstretched. In some instances, a stretchable reflective film consistent with the present disclosure may have a ratio of specular reflectivity when stretched by 50% to specular reflectivity when unstretched of greater than 50%, 55%, 60%, 65%, 70%, 75%, 80% or more.

Another advantage of some embodiments of the present disclosure provide is minimizing the level of diffuse reflection a stretchable reflective film exhibits when stretched. Diffuse reflection generally measures the reflection of waves (such as light) from a surface such that the incident ray is reflected at many angles. A stretchable reflective film consistent with the present disclosure may have a diffuse reflection of no more than 5%, 10%, 15%, 20% or 25% when stretched by 50% of the unstretched length according to the Diffuse Reflectivity Test Method.

Figure 2:
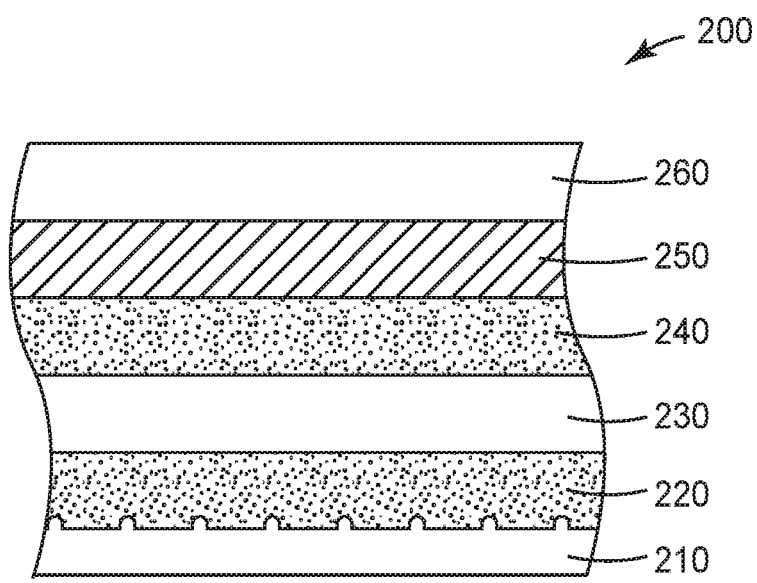
FIG. 2 shows a cross section for a stretchable reflective film with a second adhesive and a structured liner consistent with the present disclosure.

FIG. 2 shows a cross section for a stretchable reflective film 200 with a second adhesive and a liner. Stretchable reflective film 200 includes transparent polymer layer 260, continuous metal layer 250, non-reactive adhesive layer 240, and stretchable film layer 230. Each of these layers may have properties similar to or the same as those described in reference to FIG. 1. FIG. 2 additionally shows second adhesive layer 220 and structured liner 210.

Second adhesive layer 220 can be used to apply and adhere stretchable reflective film 200 to a complex surface, such as a vehicle. Stretchable adhesive layer 220 can be made from a variety of pressure sensitive adhesives. Adhesives are often selected based upon the type of substrate they are to be adhered to. Classes of pressure sensitive adhesives include acrylics, tackified rubber, tackified synthetic rubber, ethylene vinyl acetate, silicone, and the like. Suitable acrylic adhesives are disclosed, for example, in U.S. Pat. Nos. 3,239,478, 3,935,338, 5,169,727, U.S. Pat. No. RE 24,906, U.S. Pat. Nos. 4,952,650, and 4,181,752.

A preferred class of pressure-sensitive adhesives are the reaction product of at least alkyl acrylate with at least one reinforcing comonomer. Suitable alkyl acrylates are those having a homopolymer glass transition temperature below about −10 (degree) C. and include, for example, n-butyl acrylate, 2-ethylhexylacrylate, isoctylacrylate, isononyl acrylate, octadecyl acrylate and the like. Suitable reinforcing monomers are those having a homopolymer glass transition temperature about −10 (degree) C., and include for example, acrylic acid, itaconic acid, isobornyl acrylate, N,N-dimethylacrylamide, N-vinyl caprolactam, N-vinyl pyrrolidone, and the like.

The thickness of the adhesive is dependent upon several factors, including for example, the adhesive composition, whether the adhesive includes microstructured surfaces, the type of substrate, and the thickness of the film. Those skilled in the art are capable of adjusting the thickness to address specific application factors.

In the manufacturing process, stretchable adhesive layer may be coated onto structured liner 210, which can then be laminated to the remainder of the stretchable reflective film 200 construction. Structured liner 210 is removed for the purpose of applying the stretchable reflective film 200. When structured liner 210 is removed, the adhesive retains the inverse structure of the liner. While the structured liner 210 can include a variety of structures, in many instances, the structures are used to reduce the initial tack of a film to a surface, so that an installer can slide and reposition the film easily to get it into the correct place. The structures may also include ridges that form channels in the second adhesive layer 220 to allow air to escape during the film application process, so that bubbles are not trapped below the surface of the film. Various post and channel configurations are described in further detail in U.S. Pat. No. 6,524,675 to Mikami et al.; and U.S. Pat. No. 5,897,930 to Calhoun et al., both of which are incorporated herein by reference.

EXAMPLES

Conformable, stretchable reflective film based articles were prepared and laminated to a base substrate with a charge neutral, or non-reactive interlayer adhesive. Constructions were produced varying the metal selection and thickness. The resultant constructions were tested for specular reflection before and after stretching with and without heat. These examples are merely for illustrative purposes only and are not meant to be limiting on the scope of the appended claims. All parts, percentages, ratios, etc. in the examples and the rest of the specification are by weight, unless noted otherwise.

TABLE 1

Materials and Sources.

| Abbreviation | Description |
|---|---|
| P1 | Aliphatic water based polyurethane, commercially available from ALBERDINGK BOLEY, Greensboro, NC as U910 |
| XL1 | 40% Carbodiimide Crosslinker commercially available from NISSHINBO CHEMICAL Inc., Tokyo, Japan as CARBODILITE V-02-L |
| Sn | Tin Metal Shot, commercially available from Mallinckrodt Chemical Works, St. Louis, MO in a purity of 99.97% |
| Ni | Nickel Pellets, commercially available from Kurt J. Lesker Company, Jefferson Hills, PA in a purity of 99.995%. |
| Cr | Chromium Flake, commercially available from Vacuum Engineering Materials (VEM), Santa Clara, CA in a purity of 99.99%. |
| In | Indium Foil, commercially available from Leico Industries, Inc., New York, NY in a purity of 99.9%. |
| Al | Aluminum granules, commercially available from Materion Advanced Materials, Milwaukee, WI in a purity of 99.99%. |
| OCA | 3M Optically Clear Adhesive, commercially available from 3M Company, Saint Paul, MN as 8171 |
| SV480 | 0.0508 mm (2 mil) Non PVC print wrap film commercially available from 3M Company, Saint Paul, MN as 3M ™ ENVISION ™ Print Wrap Film SV480mc |
| L1 | 0.0508 mm (2 mil) Polyester casting liner commercially available from Mitsubishi Polyester Film, Inc., Greer, SC as HOSTAPHAN Polyester Film MT44 |

Test Methods

Total Reflectivity

A Perkin Elmer Lambda model 1050 WB UV/VIS/NIR spectrophotometer (d/8) was used in accordance with pertinent sections of ASTM method E1164 to obtain reflection spectra to measure the Total Reflectivity (specular included) of each sample. Total Reflectivity is defined as the arithmetic mean (flat weighting) of the total spectral response (specular included) between 400-780 nm in 5 nm increments. Prior to measurement, reflection calibration was conducted using a traceable specular reference (Serial #: OMT-212046-01 available from OMT SOLUTIONS, Eindhoven, The Netherlands) across an EM band range of 250-2500 nm in 1 nm increments.

Diffuse Reflectivity

A Perkin Elmer Lambda model 1050 WB UV/VIS/NIR spectrophotometer (d/8) was used in accordance with pertinent sections of ASTM method E1164 to measure the Diffuse Reflectivity (specular excluded) of each sample. Diffuse Reflectivity is defined as the arithmetic mean (flat weighting) of the diffuse spectral response, with the specular port removed, between 400-780 nm in 5 nm increments. Prior to measurement, reflection calibration was conducted using a traceable specular reference (Serial #: OMT-212046-01 available from OMT SOLUTIONS, Eindhoven, The Netherlands) across an EM band range of 250-2500 nm in 1 nm increments.

Specular Reflectivity

Specular Reflectivity was calculated as the difference between the flat weighted Total Reflectivity (specular included) and the flat weighted Diffuse Reflectivity (specular excluded).

Preparation of Samples

Polyurethane Film

A solution was produced by measuring out 40 g of U910 (P1) and slowly adding 2.7 g of XL1 (9% active ingredient by weight of P1 solids). The solution was mixed with a stir stick and then allowed to mix on a rolling bed for at least 15 minutes. The solution was coated onto the glossy side of L1 by using a number 28 meyer rod available from Gardco Paul N. Gardner Company, Incorporated, of Pompano Beach, Fla. Several samples were produced in this manner and were then cured in an oven at 75 C for 90 seconds, followed by 120 C for 45 seconds, and 177 C for 90 seconds. The resulting films had a coating thickness of approximately 25 um (1 mil).

Metallization

The physical vapor deposition of the various metals was done in an Integrity Coater supplied by Denton Vacuum of Moorestown, N.J. This system is a 5-planet optical coating system for metallic and ophthalmic thin film coatings. The samples were ion beam pretreated at a power of 100 mA using a 6" (15.24 cm) round gridded Kaufman type ion source in an oxygen atmosphere. The pressure during pretreatment is approximately 5 millitorr. Duration of the pretreatment is 10 minutes. The metals were heated and evaporated using a Temescal 270 degree electron beam gun (SFIH-270). The deposition is controlled via an Inficon deposition rate controller and a quartz crystal monitor with specifics shown in the Table 2 below.

TABLE 2

| | Metallization | | | | |
|---|---|---|---|---|---|
| | Nickel (Ni) | Tin (Sn) | Aluminum (Al) | Chromium (Cr) | Indium (In) |
| Rate | 3 Å/sec | 10 Å/sec | 15 Å/sec | 2 Å/sec | 5 Å/sec |
| Max Power | 18% | 18% | 16% | 13% | 14% |

The chamber was pumped to a pressure of $<2.0 \times 10^{-5}$ Torr prior to coating. After films were evaporative coated, complete constructions were produced. The constructions used for the Examples are consistent with the layers shown in FIG. 2. The selection of metal and metal thickness were varied according to Table 3.

TABLE 3

| Full Construction Samples Produced | | |
|---|---|---|
| Example No. | Metal | Metal Thickness (nm) |
| E1 | Sn | 30 |
| E2 | Sn | 60 |
| E3 | Sn | 70 |
| E4 | Sn | 90 |
| E5 | Sn | 110 |
| CE6 | Ni | 60 |
| CE7 | Al | 60 |
| CE8 | Cr | 60 |
| E9 | In | 60 |

Interlayer Adhesive and Lamination of Layers

Samples were produced with OCA adhesive, which was available in transfer film format. The OCA transfer film was laminated to the SV480 base film, followed by lamination to the metallized polyurethane. The lamination did not include heat and 178 Newtons (40 lbs.) of nip pressure was used.

Once the constructions were completed, liner L1 was removed prior to measurements.

Unstretched Samples

Samples of each construction from Table 3 (1 inch (2.54 cm) wide by 6 inches (15.24 cm) long) were applied to, and the ends wrapped around, aluminum panels (available from Q-Lab Corp. Westlake, Ohio as Q-PANEL number ED-2.75×11NH, using 5052H38 Bare Aluminum, 0.025"× 2.75"×11" (0.64 mm×1.08 cm×27.94 cm), Etch & Desmut panels) to create a 1"×2.75" (2.54 cm×6.99 cm) exposed sample. Total and Diffuse Reflection values were obtained on each sample, and Specular Reflection was calculated using the methods described above.

Stretched Samples

An Instron 59CP with system ID EMSYSU4242 was used to stretch samples (1 inch (2.54 cm) wide by 6 inches (15.24 cm) long) to varying amounts of stretch (10%, 20%, 30%, 40%, and 50%) relative to initial 3 inch (7.62 cm) film gap. Stretching was completed in a room at 75° F. and 75% humidity and at a stretch rate of 12 inches/minute (30.48 cm/min) for each of the constructions produced in Table 3. While the stretched film sample was still clamped in the Instron, an aluminum panel (available from Q-Lab Corp. Westlake, Ohio as Q-PANEL number ED-2.75×11NH, using 5052H38 Bare Aluminum, 0.025"×2.75"×11" (0.64 mm×1.08 cm×27.94 cm), Etch & Desmut panels) was positioned under the sample, in the center of the stretched area. Then the stretched film sample was applied to the test panel, making sure it was applied without any air bubbles under the film.

In addition, one sample of each construction in Table 3 (1 inch (2.54 cm) wide by 6 inches (15.24 cm) long) was stretched 30% relative to initial 3 inch (7.62 cm) film gap at a temperature of 150° F. within an Instron environmental chamber system ID 3119-609/0006391 that encloses the Instron 59CP. While the stretched film sample was still clamped in the Instron, an aluminum panel (available from Q-Lab Corp. Westlake, Ohio as Q-PANEL number ED-2.75×11NH, using 5052H38 Bare Aluminum, 0.025"× 2.75"×11" (0.64 mm×1.08 cm×27.94 cm) Etch & Desmut panels) was positioned under the sample, in the center of the stretched area. Then the stretched film sample was applied to the test panel, making sure it was applied without any air bubbles under the film.

Total and Diffuse Reflection values were obtained on each sample, and Specular Reflection was calculated using the methods described above.

Impact of Metal Selection on Diffuse and Specular Reflection after Stretching

As outlined in Table 3, five samples with different metals (Al, Ni, Sn, In, and Cr) were produced with a coating of 60 nm and tested as described above. Table 4 shows the resulting Specular Reflection for each metal when stretched from 0% (unstretched) to 50%. As shown in Table 4, Al has the highest initial reflectivity but drops below that of In or Sn starting at 20% stretch and continues to drop below 30% specular reflection at 50% stretch. Ni and Cr have an initial lower specular reflection than Sn and In and drop in specular reflection after stretching. Table 5 shows the percentage loss (from original unstretched sample) in Specular Reflection as each sample is stretched from 10% to 50% and Table 6 shows the ratio of stretched to unstretched specular reflectivity, with the level of stretch ranging from 10% to 50%.

While the Specular Reflection decreases as the samples are stretched, the Diffuse Reflection tends to increase due to hazing of the film as the metals crack. Table 7 shows the resulting Diffuse Reflection for each metal when stretched from 0% (unstretched) to 50%. Cr, Ni, and Al all increase in Diffuse Reflectivity due to the hazing of the film from cracking of the metals as they are stretched. Sn (E2) and In (E9) on the other hand showed less cracking and hazing and maintained a Diffuse Reflection below 15% when stretched to 50%.

TABLE 4

Percent Specular Reflectivity with % Stretch for Varying Metals Coated to 60 nm.

| Sample No. | Metal | 0% Stretch | 10% Stretch | 20% Stretch | 30% Stretch | 40% Stretch | 50% Stretch |
|---|---|---|---|---|---|---|---|
| E2 | Sn | 64.0% | 57.5% | 51.3% | 43.5% | 39.9% | 36.7% |
| CE8 | Cr | 24.4% | 17.6% | 13.9% | 10.6% | 9.0% | 7.8% |
| E9 | In | 59.1% | 55.1% | 47.4% | 43.5% | 39.8% | 36.1% |
| CE6 | Ni | 52.6% | 36.9% | 26.4% | 22.6% | 11.5% | 8.9% |
| CE7 | Al | 84.0% | 74.0% | 49.3% | 43.7% | 34.2% | 28.1% |

TABLE 5

Percent Specular Reflectivity Loss with % Stretch for Varying Metals Coated to 60 nm.

| Sample No. | Metal | 10% Stretch | 20% Stretch | 30% Stretch | 40% Stretch | 50% Stretch |
|---|---|---|---|---|---|---|
| E2 | Sn | 11.4% | 24.9% | 47.2% | 60.6% | 74.3% |
| CE8 | Cr | 38.9% | 76.0% | 131.4% | 172.9% | 214.1% |
| E9 | In | 7.3% | 24.7% | 35.9% | 48.6% | 63.7% |
| CE6 | Ni | 42.4% | 99.2% | 132.8% | 358.4% | 491.4% |
| CE7 | Al | 13.5% | 70.4% | 92.1% | 145.4% | 198.6% |

TABLE 6

Ratio of Stretched to Un-Stretched Specular Reflectivity for Varying Metals Coated to 60 nm.

| Sample No. | Metal | 10% Stretch | 20% Stretch | 30% Stretch | 40% Stretch | 50% Stretch |
|---|---|---|---|---|---|---|
| E2 | Sn | 0.9 | 0.8 | 0.7 | 0.6 | 0.6 |
| CE8 | Cr | 0.7 | 0.6 | 0.4 | 0.4 | 0.3 |
| E9 | In | 0.9 | 0.8 | 0.7 | 0.7 | 0.6 |
| CE6 | Ni | 0.7 | 0.5 | 0.4 | 0.2 | 0.2 |
| CE7 | Al | 0.9 | 0.6 | 0.5 | 0.4 | 0.3 |

TABLE 7

Percent Diffuse Reflectivity with % Stretch for Varying Metals Coated to 60 nm.

| Sample No. | Metal | 0% Stretch | 10% Stretch | 20% Stretch | 30% Stretch | 40% Stretch | 50% Stretch |
|---|---|---|---|---|---|---|---|
| E2 | Sn | 1.0% | 2.0% | 4.0% | 6.3% | 8.0% | 10.3% |
| CE8 | Cr | 1.3% | 7.7% | 10.9% | 14.0% | 15.4% | 16.9% |
| E9 | In | 2.0% | 2.7% | 4.6% | 5.8% | 7.0% | 9.0% |
| CE6 | Ni | 0.3% | 13.0% | 20.2% | 23.0% | 30.1% | 32.6% |
| CE7 | Al | 0.5% | 8.4% | 26.5% | 30.4% | 37.7% | 38.7% |

Metal Thickness

The impact of the metallized layer thickness was explored with a variety of samples using Sn. Table 8 shows the Specular Reflection of the various samples at varying metal thicknesses and levels of stretch.

TABLE 8

Impact of Stretch and Sn Metallization Thickness on Percent Specular Reflection.

|  | nm Sn | 0% stretch 75 F. | 10% stretch 75 F. | 20% stretch 75 F. | 30% stretch 75 F. | 40% stretch 75 F. | 50% stretch 75 F. | 30% stretch 150 F. |
|---|---|---|---|---|---|---|---|---|
| E1 | 30 | 49.4% | 45.7% | 41.1% | 38.4% | 33.0% | 33.1% | 38.8% |
| E2 | 60 | 64.0% | 57.5% | 51.3% | 43.5% | 39.9% | 36.7% | 44.0% |
| E3 | 70 | 66.9% | 57.0% | 51.4% | 41.7% | 41.8% | 39.1% | 43.1% |
| E4 | 90 | 68.1% | 60.3% | 60.8% | 46.2% | 42.5% | 38.6% | 46.3% |
| E5 | 110 | 68.5% | 59.1% | 50.6% | 47.2% | 43.5% | 44.6% | 45.7% |

While the present disclosure provides several specific examples of embodiments, variations on these embodiments, within the scope of the invention, will be obvious to one of skill in the art upon reading the present disclosure. For example, a wide range of adhesives may be used to construct a stretchable reflective film. A stretchable reflective film may be manufactured using other methods than those explicitly described herein. Other variations will be apparent to one of skill in the art upon reading the present disclosure.

What is claimed is:

1. A stretchable reflective film comprising:
   a transparent polymer layer;
   a continuous metal layer comprising at least one of tin or indium;
   a non-reactive adhesive layer; and
   a stretchable film layer;
   wherein the stretchable reflective film has at least 30% specular reflectivity according to the Secular Reflectivity Test Method, when stretched by 50% of the unstretched length at 75 degrees Fahrenheit.

2. The reflective film of claim 1, wherein the metal layer has a thickness in the range of 30 nm to 90 nm.

3. The reflective film of claim 1, wherein the metal layer has a thickness in the range of 50 nm to 70 nm.

4. The reflective film of claim 1, wherein the non-reactive adhesive layer is an optically clear adhesive.

5. The reflective film of claim 1, further comprising a second adhesive layer adjacent a major surface of the stretchable film layer opposite the non-reactive adhesive layer.

6. The reflective film of claim 5, further comprising a structured liner adjacent a major surface of the second adhesive layer opposite the stretchable film layer, wherein the structure liner comprises ridges that form channels in the second adhesive layer.

7. The reflective film of claim 1, wherein the stretchable film layer is a non-vinyl film.

8. The reflective film of claim 1, wherein the stretchable reflective film has no more than 15% diffuse reflection when stretched by 50% of the unstretched length according to the Diffuse Reflectivity Test Method.

9. A stretchable reflective film comprising:
   a transparent polymer layer;
   a continuous metal layer comprising at least one of Tin or Indium;
   a non-reactive adhesive layer; and
   a stretchable film layer;
   wherein the stretchable reflective film has no more than 15% diffuse reflection according to the Diffuse Reflectivity Test Method when stretched by 50% of the unstretched length at 75 degrees Fahrenheit.

10. The reflective film of claim 9, wherein the metal layer has a thickness in the range of 30 nm to 90 nm.

11. The reflective film of claim 9, wherein the metal layer has a thickness in the range of 50 nm to 70 nm.

12. The reflective film of claim 9, wherein the non-reactive adhesive layer is an optically clear adhesive.

13. The reflective film of claim 9, further comprising a second adhesive layer adjacent a major surface of the stretchable film layer opposite the non-reactive adhesive layer.

14. The reflective film of claim 13, further comprising a structured liner adjacent a major surface of the second adhesive layer opposite the stretchable film layer, wherein the structure liner comprises ridges that form channels in the second adhesive layer.

15. The reflective film of claim 9, wherein the stretchable film layer is a non-vinyl film.

16. A stretchable reflective film comprising:
    a transparent polymer layer;
    a continuous metal layer comprising at least one of tin or indium;
    a non-reactive adhesive layer; and
    a stretchable film layer;
    wherein ratio of the specular reflectivity of the stretchable reflective film when stretched by 50% at 75 degrees Fahrenheit, to the specular reflectivity of the stretchable reflective film when unstretched is greater than 50% according to Specular Reflectivity Test Method.

17. The reflective film of claim 16, wherein the metal layer has a thickness in the range of 30 nm to 90 nm.

18. The reflective film of claim 16, wherein the metal layer has a thickness in the range of 50 nm to 70 nm.

19. The reflective film of claim 16, wherein the non-reactive adhesive layer is an optically clear adhesive.

20. The reflective film of claim 16, further comprising a second adhesive layer adjacent a major surface of the stretchable film layer opposite the non-reactive adhesive layer.

21. The reflective film of claim 20, further comprising a structured liner adjacent a major surface of the second adhesive layer opposite the stretchable film layer, wherein the structure liner comprises ridges that form channels in the second adhesive layer.

22. The reflective film of claim 16, wherein the stretchable film layer is a non-vinyl film.

\* \* \* \* \*